(12) United States Patent
Miyoshi et al.

(10) Patent No.: US 7,626,919 B2
(45) Date of Patent: Dec. 1, 2009

(54) OFDM SIGNAL COLLISION POSITION DETECTION APPARATUS AND OFDM RECEPTION DEVICE

(75) Inventors: Kenichi Miyoshi, Yokohama (JP); Akihiko Nishio, Yokosuka (JP)

(73) Assignee: Panasonic Corporation, Osaka (JP)

(*) Notice: Subject to any disclaimer, the term of this patent is extended or adjusted under 35 U.S.C. 154(b) by 446 days.

(21) Appl. No.: 10/542,772

(22) PCT Filed: Jan. 21, 2004

(86) PCT No.: PCT/JP2004/000458

§ 371 (c)(1),
(2), (4) Date: Jul. 20, 2005

(87) PCT Pub. No.: WO2004/068757

PCT Pub. Date: Aug. 12, 2004

(65) Prior Publication Data

US 2006/0072450 A1  Apr. 6, 2006

(30) Foreign Application Priority Data

Jan. 31, 2003 (JP) .............................. 2003-023747

(51) Int. Cl.
*H04J 11/00* (2006.01)
(52) U.S. Cl. ..................... 370/208; 370/332; 370/329; 370/344; 455/450; 375/285
(58) Field of Classification Search ................ 370/210, 370/205, 203, 208, 332, 344, 329; 455/450; 375/285

See application file for complete search history.

(56) References Cited

U.S. PATENT DOCUMENTS

| 5,726,978 | A  | * | 3/1998 | Frodigh et al. | 370/252 |
| 6,628,735 | B1 | * | 9/2003 | Belotserkovsky et al. | 375/355 |
| 6,720,824 | B2 | * | 4/2004 | Hyakudai et al. | 329/304 |
| 6,735,423 | B1 | * | 5/2004 | Uskali et al. | 455/249.1 |
| 6,795,426 | B1 | * | 9/2004 | Raleigh et al. | 370/345 |
| 6,798,738 | B1 | * | 9/2004 | Do et al. | 370/210 |

(Continued)

FOREIGN PATENT DOCUMENTS

EP   929202   7/1999

(Continued)

OTHER PUBLICATIONS

PCT International Search Report dated Apr. 20, 2004.

*Primary Examiner*—Ricky Ngo
*Assistant Examiner*—Dewanda Samuel
(74) *Attorney, Agent, or Firm*—Dickinson Wright, PLLC

(57) ABSTRACT

A pilot reception power measuring section 104 measures reception power of a pilot symbol and a data section reception power prediction section 106 predicts reception power of data symbols based on the reception power of the pilot symbol. A power comparison section 107 calculates a difference between this predicted value and the actual reception power of the data symbol, and when the difference is large, a collision position detection section 108 regards the data symbol at the hopping position as colliding with data symbols in other cells. Then, an error correcting decoding section 103 carries out error correcting processing by reducing likelihood of the data symbols detected to be involved in the collision and can thereby improve the error rate characteristic of decoded data.

6 Claims, 10 Drawing Sheets

U.S. PATENT DOCUMENTS

| | | | |
|---|---|---|---|
| 6,904,550 B2 * | 6/2005 | Sibecas et al. | 714/714 |
| 7,002,934 B2 * | 2/2006 | Dolgonos et al. | 370/328 |
| 7,075,949 B2 * | 7/2006 | Okada et al. | 370/510 |
| 7,110,387 B1 * | 9/2006 | Kim et al. | 370/344 |
| 7,187,646 B2 * | 3/2007 | Schramm | 370/206 |
| 2002/0191569 A1 | 12/2002 | Sung et al. | |
| 2003/0031278 A1 * | 2/2003 | Kang et al. | 375/341 |

FOREIGN PATENT DOCUMENTS

| | | |
|---|---|---|
| EP | 1148673 | 10/2001 |
| EP | 1148674 | 10/2001 |
| JP | 06343066 | 12/1994 |
| JP | 09064884 | 3/1997 |
| JP | 11252040 | 9/1999 |
| JP | 11289578 | 10/1999 |
| JP | 11355178 | 12/1999 |
| JP | 2001358694 | 12/2001 |
| JP | 2001358695 | 12/2001 |
| JP | 2003535556 | 11/2003 |

* cited by examiner

COLLISION OF HOPPING PATTERNS

OFDM SIGNAL COLLISION POSITION DETECTION APPARATUS AND OFDM RECEPTION DEVICE

TECHNICAL FIELD

The present invention relates to an OFDM signal collision position detection apparatus, an OFDM reception apparatus and a method therefor, and is suitable for use in an OFDM reception apparatus used in an OFDM system based on a frequency hopping scheme, etc.

BACKGROUND ART

In a mobile communication system, an OFDM scheme using frequency hopping is under study. An OFDM system using frequency hopping uses different hopping patterns among a plurality of cells so as to carry out communications by averaging interference among cells.

That is, when two neighboring cells A, B as shown in FIG. 1 are considered, a base station BSA in the cell A and a base station BSB in the cell B transmit OFDM signals with different hopping patterns. Since these hopping patterns are normally determined at random in the cell A and cell B, there is a possibility that collision may occur by accident on a certain subcarrier at a certain time point.

This will be explained using FIG. 2. FIG. 2 shows a frequency hopping OFDM signal transmitted from the base station BSA in the cell A and a frequency hopping OFDM signal transmitted from the base station BSB in the cell B. One unit on the vertical axis shows a subcarrier and one unit on the horizontal axis shows a 1-burst period. That is, suppose one OFDM symbol is arranged in one square in the figure.

As is also clear from FIG. 2, an OFDM signal in the cell A collides with an OFDM signal in the cell B by accident on a certain subcarrier at a certain time point. As shown in FIG. 3, reception quality of a data symbol placed on the subcarrier at the time of collision deteriorates compared to other data symbols.

Thus, in an OFDM system using frequency hopping, the quality of symbols affected by interference from other cells deteriorates, and therefore it is necessary to carry out error correcting processing at the time of decoding to correct the data of the symbols whose quality is deteriorated to correct decoded data.

Here, a normal error correcting code is designed to carry out error correction on assumption that the communication path is affected by white Gaussian noise. However, in a system like OFDM using frequency hopping, its communication path does not show white Gaussian noise but it shows a state in which impulse-like noise is added. For this reason, there is a problem that its error correcting performance deteriorates.

In order to correctly decode the signal affected by this impulse-like noise, there is also a code such as a Reed-Solomon code which is used to carry out error correcting processing by regarding symbols of poor reception quality as having been lost. However, even when a Reed-Solomon code is used, it is necessary to correctly notify the error correcting decoding section of symbols of poor reception quality.

In order to obtain decoded data having a good error rate characteristic from such a frequency hopping OFDM signal, it is necessary to correctly detect symbols involved in a collision. As one of such methods for detecting symbols, use of the method disclosed in the Unexamined Japanese Patent Publication No. HEI 11-252040 can be considered.

The technology described in the above Publication detects a subcarrier affected by interference by monitoring the state of a pilot signal placed on a specific subcarrier of an OFDM signal. Then, by carrying out weighting processing such as loss correction during error correcting processing according to the detection result, the above technology obtains decoded data with a good error rate characteristic even when interference occurs.

However, even if an attempt is made to detect the collision position on a frequency-hopped OFDM signal using the conventional interference detection apparatus described in the above Publication, it is not possible to detect the position of a data symbol on which the collision has occurred. This is because while a pilot signal is a signal placed on a predetermined subcarrier at a predetermined timing, a collision of a data symbol occurs on a subcarrier and at a timing which cannot be predicted from the pilot signal.

Therefore, it is possible to consider a method for detecting a symbol of poor quality as a symbol on which a collision has occurred by directly measuring the reception quality of a data symbol. However, since the data symbol is not a known signal, it is not possible to measure the reception quality (e.g., SIR (Signal to Interference Ratio)) of the data symbol.

Thus, the conventional OFDM system using frequency hopping cannot correctly detect a data symbol on which a collision has occurred. As a result, there is a problem that the error rate characteristic of decoded data deteriorates.

Furthermore, this problem is not limited to the OFDM system using frequency hopping, but can also occur, for example, in an OFDM system having a frequency scheduler. That is, this type of OFDM system is designed to measure the channel quality of each subcarrier in each cell, place a data symbol on a subcarrier of good channel quality and transmit it. But in such a case, there is also a possibility that a collision may occur on a certain subcarrier between neighboring cells and cause deterioration of the error rate characteristic of decoded data.

DISCLOSURE OF INVENTION

It is an object of the present invention to provide an OFDM signal collision position detection apparatus and a method therefor capable of accurately detecting the positions of data symbols colliding with each other between a plurality of cells and further provide an OFDM reception apparatus and a method therefor capable of obtaining decoded data with an improved error rate characteristic using detected collision position information.

This object can be attained by comparing reception power of a data symbol predicted from reception power of a pilot symbol with the actual reception power of the data symbol for each subcarrier and every burst period and regarding, when the reception power of the data symbol is changed from the reception power predicted from the reception power of the pilot symbol, the data symbol as being affected by interference (that is, there is a collision between the neighboring cells). Then, by notifying an error correcting decoding section of the detected data symbol, it is possible to improve the error rate characteristic of decoded data.

BEST MODE FOR CARRYING OUT THE INVENTION

With reference now to the attached drawings, embodiments of the present invention will be explained in detail below.

Embodiment 1

Figure 4:
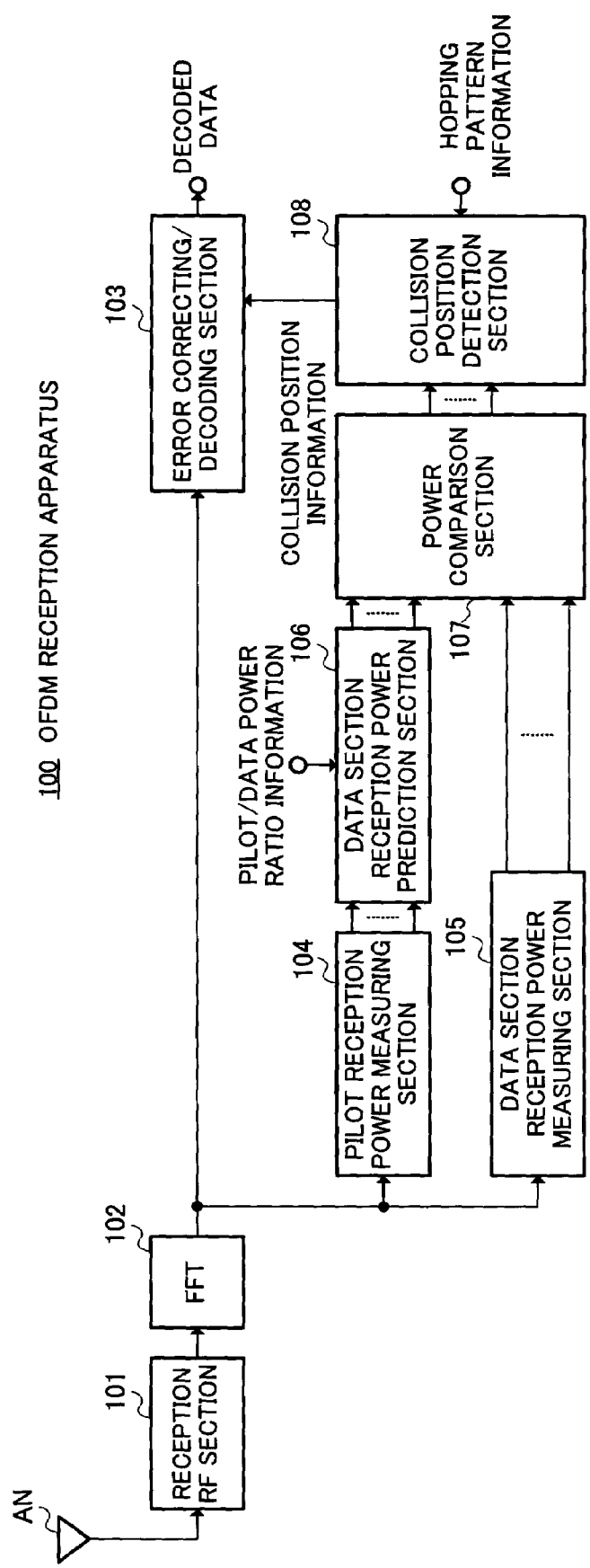
FIG. 4 is a block diagram showing the configuration of an OFDM reception apparatus according to Embodiment 1 of the present invention.

FIG. 4 is a block diagram showing the configuration of an OFDM reception apparatus according to Embodiment 1 of the present invention. The OFDM reception apparatus 100 receives a frequency-hopped OFDM signal by an antenna AN, applies radio reception processing such as down-conversion and analog/digital conversion, etc., by a reception radio (reception RF) section 101, and then sends the processed signal to a fast Fourier transform circuit (FFT) 102. The FFT 102 obtains a symbol superimposed on each subcarrier by applying fast Fourier transform processing to the input signal and sends the symbol to an error correcting decoding section 103, a pilot reception power measuring section 104 and a data section reception power measuring section 105.

The pilot reception power measuring section 104 measures reception power of a pilot symbol superimposed on a predetermined subcarrier at a predetermined timing to thereby measure reception power of the pilot symbol of each subcarrier. Unlike the data symbol, the pilot symbol is placed at a position where no collision occurs between neighboring cells, and therefore the pilot reception power measuring section 104 measures reception power not affected by interference between neighboring cells.

A data section reception power prediction section 106 predicts reception power of the data symbol not affected by interference (collision) based on information on the power ratio between the pilot symbol and data symbol and sends the prediction result to a power comparison section 107. Here, a pilot symbol is sent with greater power than that of a data symbol and the power ratio is a fixed value. The OFDM reception apparatus 100 stores the power ratio information in memory (not shown). For example, when the power ratio between the pilot symbol and data symbol is 2:1, the data section reception power prediction section 106 multiplies the measurement result of the pilot reception power measuring section 104 by ½ and outputs the multiplication result as the predicted reception power of the data symbol.

The data section reception power measuring section 105 measures the reception power of the actually received data symbol for each subcarrier and every burst period and sends the measurement result to the power comparison section 107.

The power comparison section 107 compares the reception power of the data symbol predicted by the data section reception power prediction section 106 with the actual reception power of the data symbol measured by the data section reception power measuring section 105 for each subcarrier and sends the comparison result to a collision position detection section 108. The power comparison section 107 actually calculates a difference between the prediction result by the data section reception power prediction section 106 and the measurement result by the data section reception power measuring section 105 for each corresponding subcarrier and every burst period and sends the difference to the collision position detection section 108.

The collision position detection section 108 detects a position where there is a large variation in the actually measured reception power of the data signal with respect to the reception power of the data signal predicted from the pilot signal (that is, position where the difference value is large) based on the difference value from the power comparison section 107 and thereby detects the positions of data symbols colliding with each other between a plurality of cells.

Figure 1:
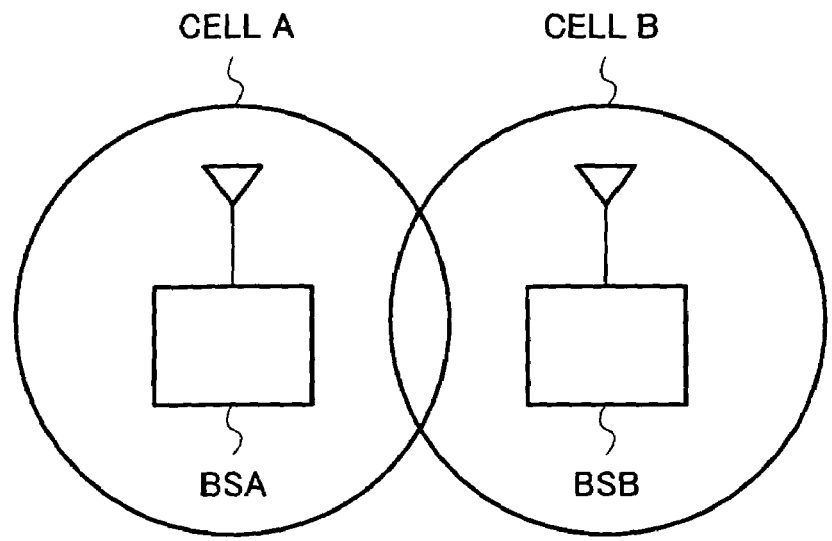
FIG. 1 illustrates neighboring cells.
Figure 2:
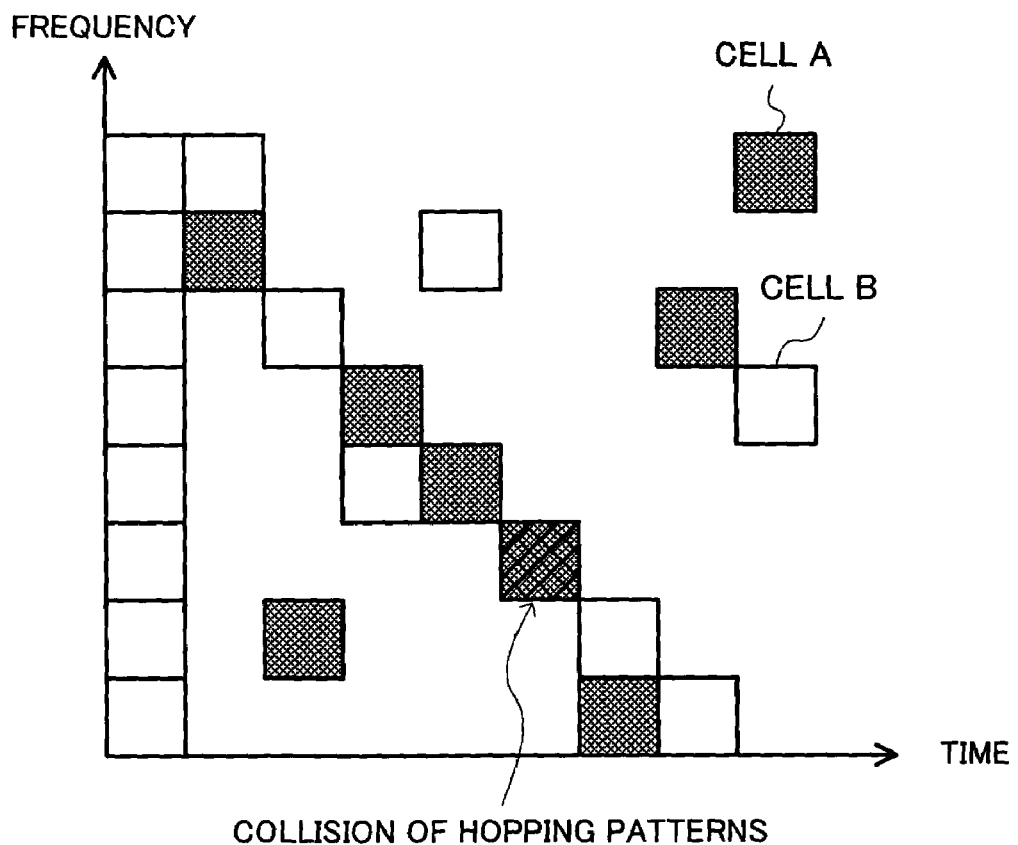
FIG. 2 illustrates a collision between data symbols of frequency hopping OFDM signals.
Figure 3:
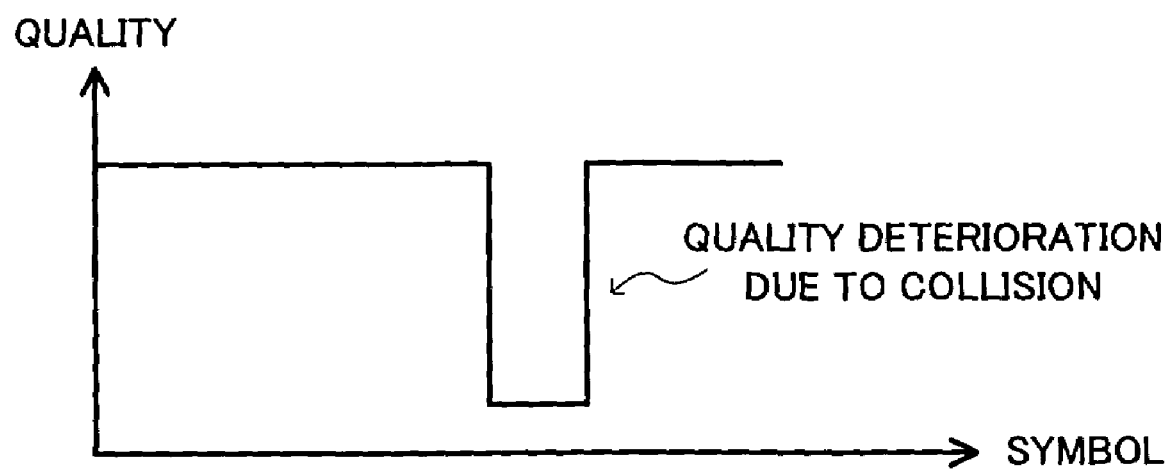
FIG. 3 illustrates deterioration of quality of a data symbol caused by a collision.

The collision position detection section 108 carries out detection processing only at a position indicated by hopping pattern information (subcarrier and burst period: e.g., position of the cell A in FIG. 2). This hopping pattern is notified beforehand from the base station in the cell to which the own station belongs. When the collision position detection section 108 detects the collision position of the data symbol, it sends the collision position to the error correcting decoding section 103 as collision position information.

Figure 5:
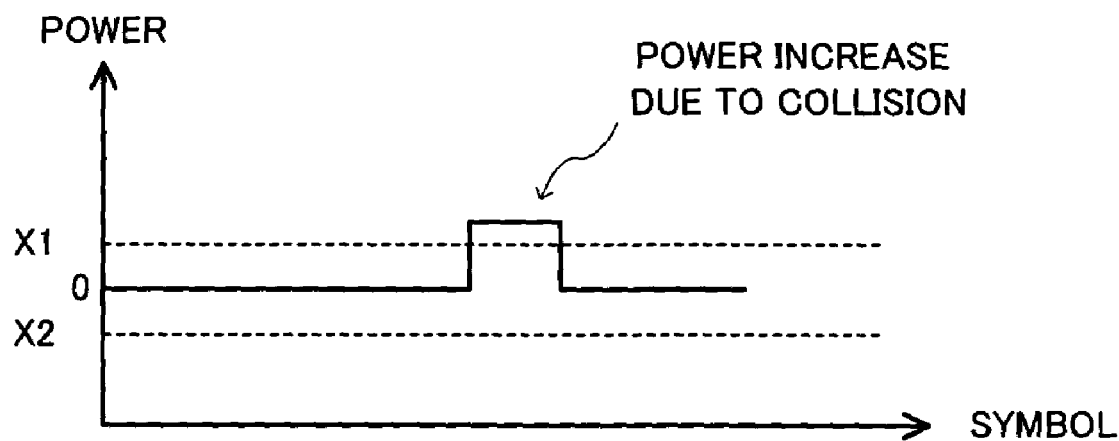
FIG. 5 illustrates a threshold X1 for detecting a data symbol whose reception power has increased due to a collision.
Figure 6:
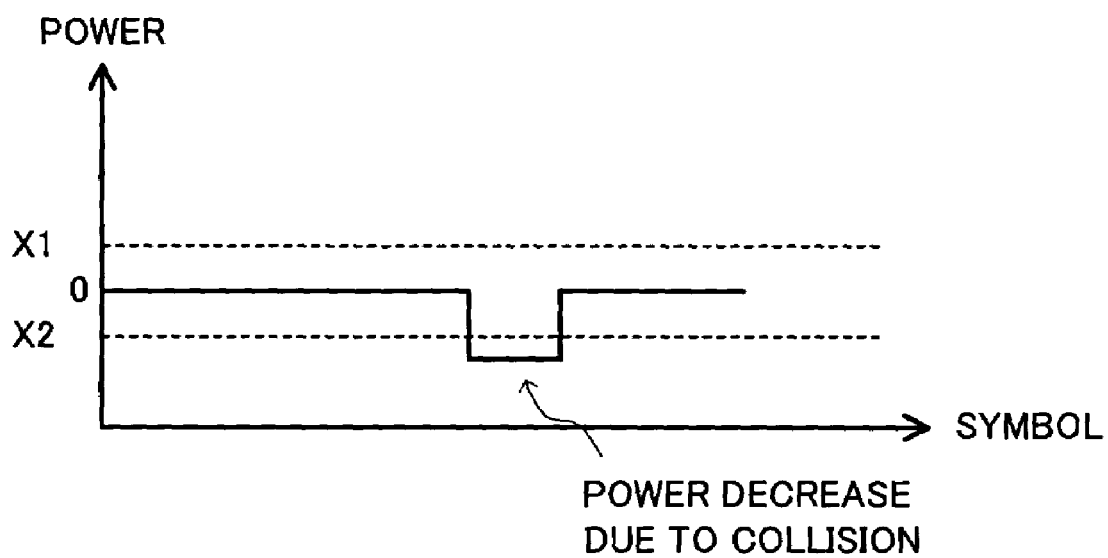
FIG. 6 illustrates a threshold X2 for detecting a data symbol whose reception power has decreased due to a collision.

In this embodiment, the collision position detection section 108 makes a threshold decision using two thresholds X1, X2 to detect the collision position. Here, as shown in FIG. 5, the first threshold X1 is a threshold in a positive direction taking into account an increase of power due to a collision, while the second threshold X2 is a threshold in a negative direction taking into account the power decrease due to a collision as shown in FIG. 6.

Figure 7:
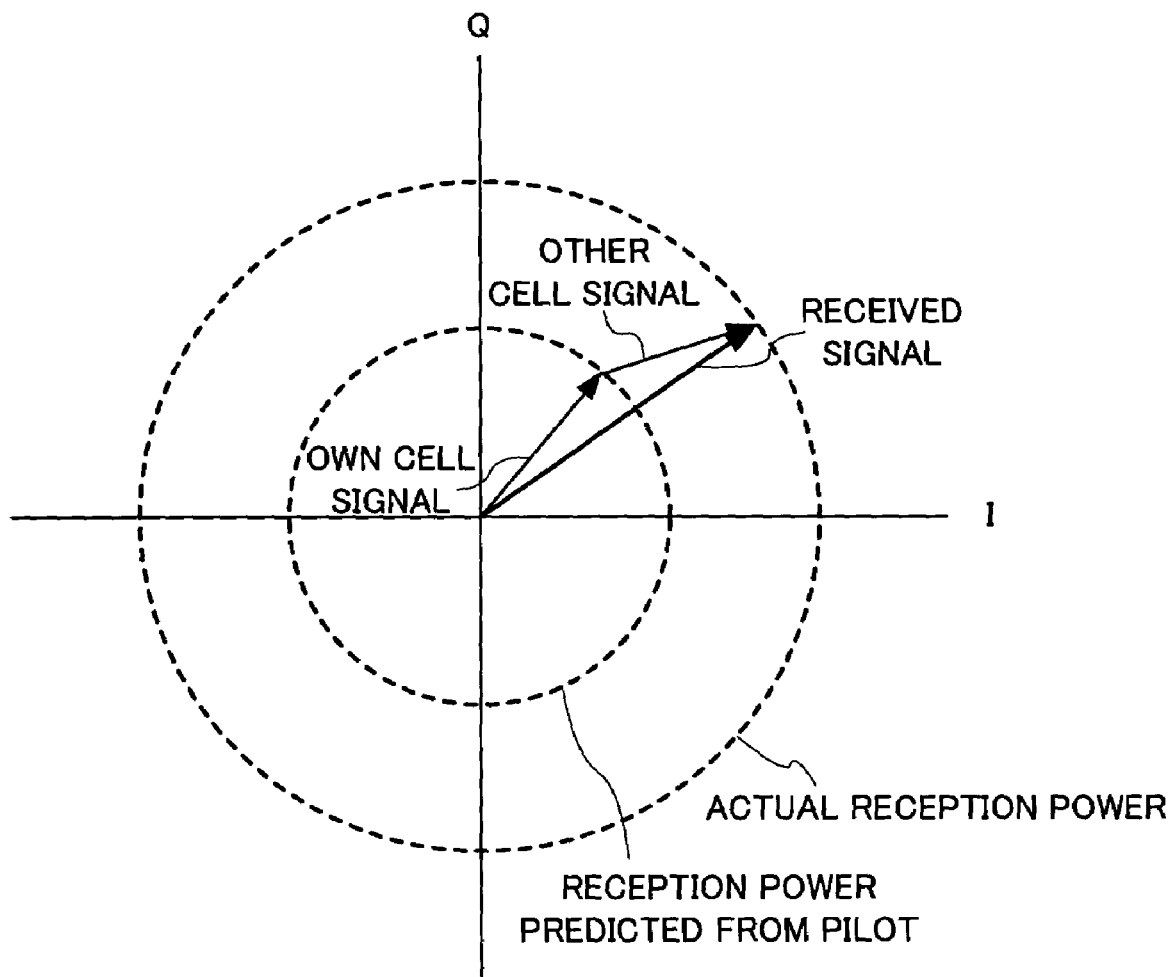
FIG. 7 illustrates a phase relationship between cells when reception power increases due to a collision.
Figure 8:
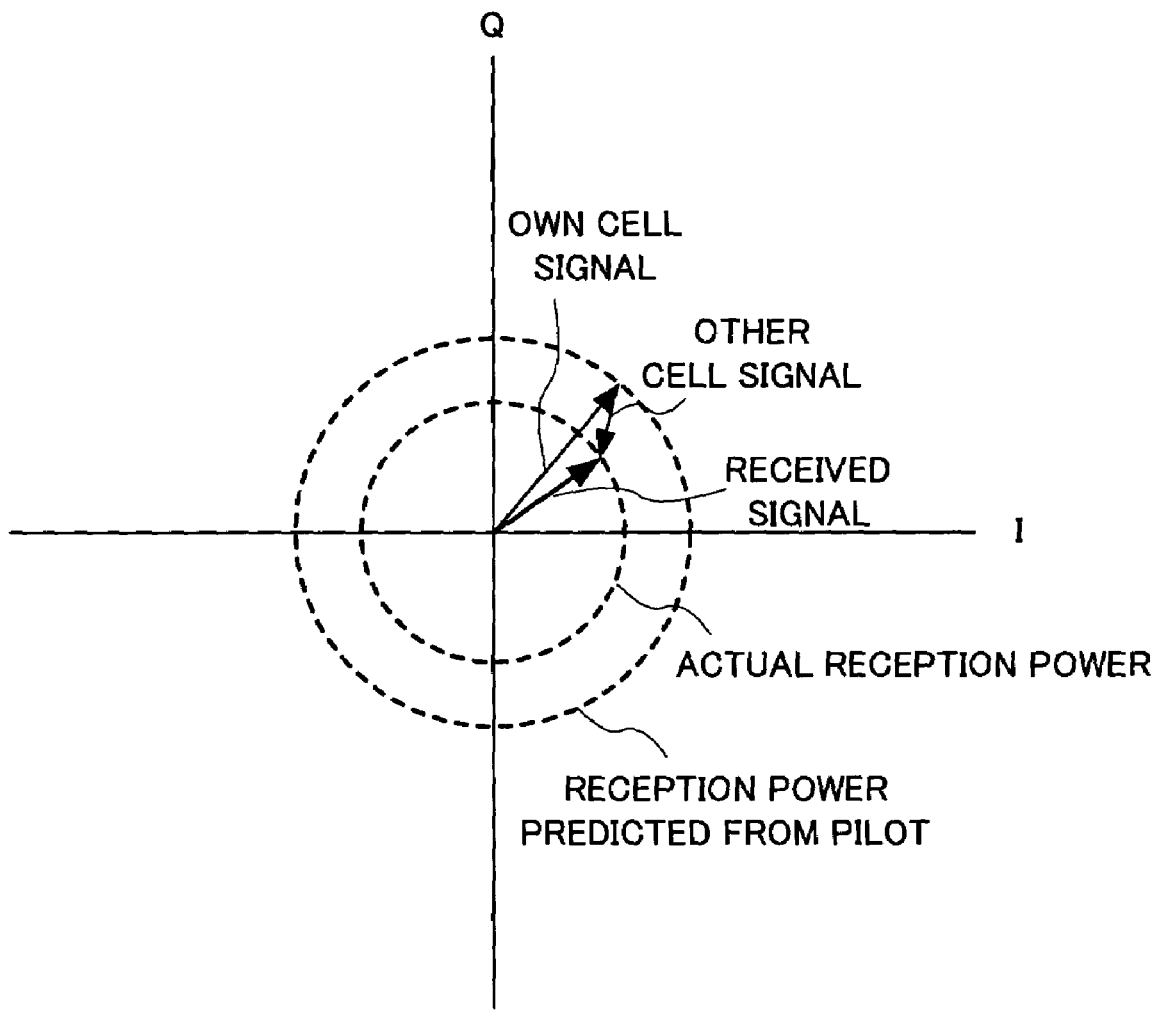
FIG. 8 illustrates a phase relationship between cells when reception power decreases due to a collision.

As shown in FIG. 7, when another cell signal having a similar phase collides with the own cell signal, the actually measured reception power of the data symbol is greater than the reception power of the data symbol predicted from the pilot symbol. That is, in such a case, the reception power increases due to the collision. On the other hand, as shown in FIG. 8, when another cell signal having a substantially opposite phase collides with the own cell signal, the actually measured reception power of the data symbol is smaller than the reception power of the data symbol predicted from the pilot symbol. That is, in such as case, the reception power decreases due to the collision.

Considering this, according to this embodiment, when the actually measured reception power of the data symbol is greater than the first threshold X1 in a positive direction with respect to the data symbol reception power predicted from the pilot symbol or smaller than the second threshold X2 in a negative direction, the position detection section 108 detects the case as a collision. This makes it possible to detect a collision between any data symbols without exception irrespective of the phases of data symbols involved in the collision.

The error correcting decoding section 103 obtains decoded data by carrying out decoding processing while applying error correcting processing to the data symbols. In this case, the error correcting decoding section 103 applies error correcting decoding processing by reducing the likelihood of the data symbols at the position at which the collision is detected by the collision position detection section 108. For example, when error correction using a Reed-Solomon code is carried out, the error correcting decoding section 103 carries out error correcting processing by regarding data symbols detected to be involved in a collision as a loss. This makes it possible to remove impulse-like noise due to the collision of data symbols from the error correcting processing and thereby improve the error rate characteristic of the decoded data.

According to the above described configuration, reception power of a data symbol is predicted based on reception power of a pilot symbol, and when there is a large difference between this predicted value and the actual reception power of the data symbol, the data symbol at the hopping position is regarded as colliding with a data symbol in another cell and it is thereby possible to accurately detect data symbols colliding with each other between a plurality of cells.

Furthermore, the data symbols involved in the collision are notified to the error correcting decoding section 103 and the error correcting decoding section 103 carries out error correcting processing with the likelihood of the notified data symbols reduced, and it is thereby possible to improve the error rate characteristic of the decoded data.

This embodiment has described the case where first and second thresholds X1, X2 are used and a collision is detected when the measured reception power of the data symbol is greater than the first threshold X1 in a positive direction with respect to the predicted reception power of the data symbol or smaller than the second threshold X2 in a negative direction, but the present invention is not limited to this and it is also possible to simply determine a threshold x relative to which an actually measured value is regarded as having changed from a predicted value and consider that a collision has occurred when the change is greater than x [dB]. The same will apply to Embodiments 2 to 4 which will be described later.

Furthermore, this embodiment has described the case where information on data symbols involved in a collision detected by the collision position detection section 108 is notified to the error correcting decoding section 103 so as to improve the error rate characteristic at the error correcting decoding section 103, but the use of the information on the data symbols involved in a collision detected by the collision position detection section 108 is not limited to this. The data symbol information can lso be used, for example, as information for a retransmission request and can be used for various purposes.

That is, it is possible to accurately detect the positions of data symbols colliding with each other using the collision position detection apparatus including the pilot reception power measuring section 104 as a known signal measuring section, the data section reception power measuring section 105 as a data signal measuring section, the data section reception power prediction section 106 as a data signal prediction section, the power comparison section 107 as a power comparison section and the collision position detection section 108 as a collision position detection section.

Furthermore, this embodiment has described the case where an OFDM system using a frequency hopping scheme is applied, but the present invention is not limited to this and is widely applicable to an OFDM system such as an OFDM system having a frequency scheduler in which there is a possibility that subcarriers on which data symbols are placed may collide with each other between a plurality of cells.

Embodiment 2

Figure 9:
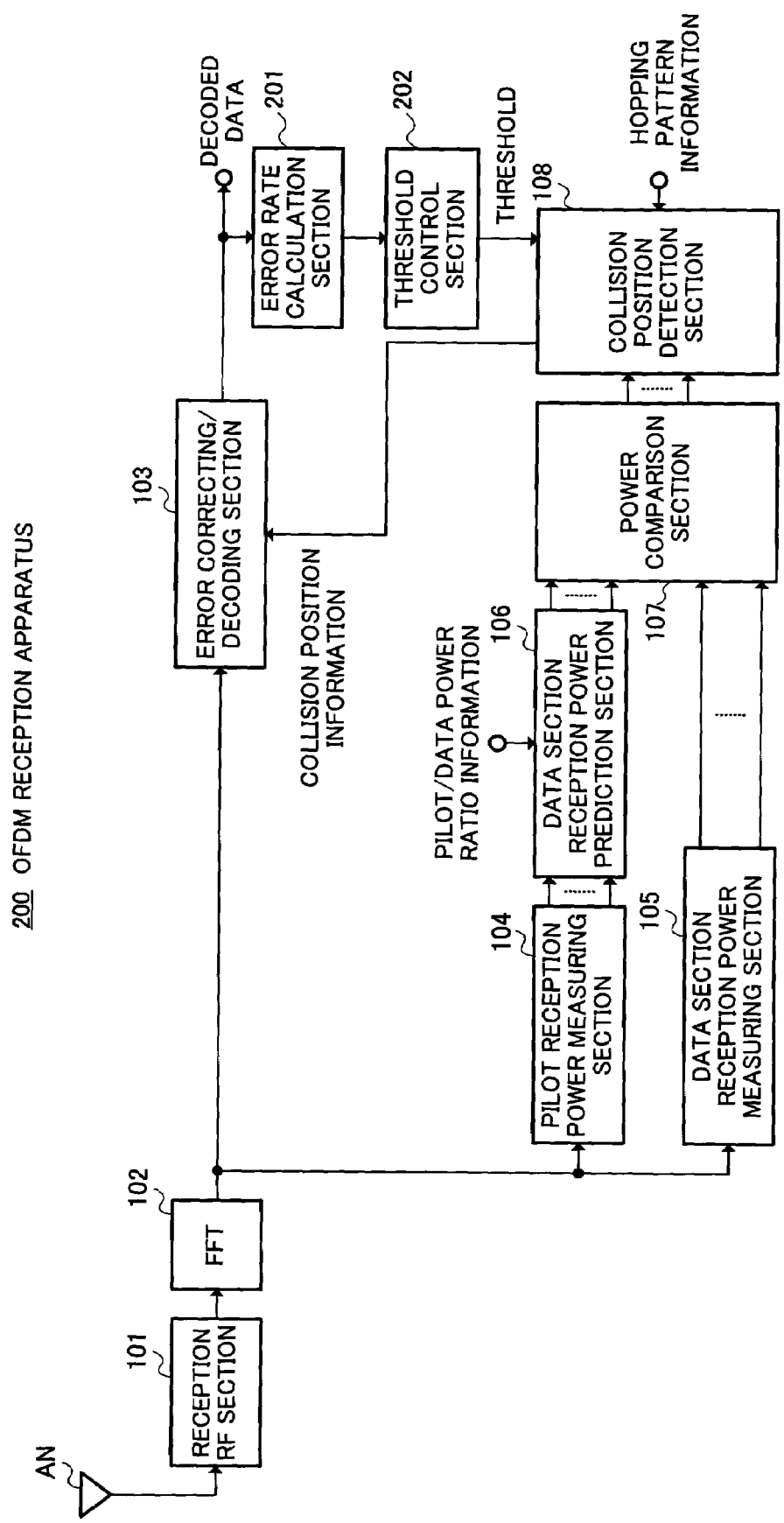
FIG. 9 is a block diagram showing the configuration of an OFDM reception apparatus according to Embodiment 2 of the present invention.

FIG. 9 in which components corresponding to those in FIG. 4 are assigned the same reference numerals shows the configuration of an OFDM reception apparatus according to Embodiment 2. The OFDM reception apparatus 200 has the same configuration as that of the OFDM reception apparatus 100 according to Embodiment 1 except that it includes an error rate calculation section 201 that calculates an error rate of decoded data and a threshold control section 202 that changes a threshold at a collision position detection section 108 according to the error rate.

The error rate calculation section 201 calculates an error rate of decoded data output from an error correcting decoding section 103 and sends the calculated error rate to the threshold control section 202. The threshold control section 202 changes a threshold used in the collision position detection section 108 according to the error rate. This allows the OFDM reception apparatus 200 according to this embodiment to use a threshold which optimizes the error rate characteristic.

More specifically, the threshold control section 202 adaptively changes the threshold while monitoring the error rate to thereby make the threshold converge to an optimal value which optimizes the error rate characteristic and supplies the threshold to the collision position detection section 108.

Here, a threshold x used in the collision position detection section 108 includes a value which optimizes the performance (error rate characteristic). This is because when the threshold x is too large, the number of data symbols which are regarded as being involved in a collision decreases, the effect of improving the error correcting performance with respect to a loss decreases, and therefore the performance deteriorates. On the contrary, when the threshold x is too small, the number of data symbols which are regarded as being involved in a collision increases, substantially all symbols are regarded as having been lost, and therefore the performance deteriorates.

In addition to the configuration of Embodiment 1, this embodiment is provided with the threshold control section 202 that controls the threshold used in the collision position detection section 108 to an optimal value, and can thereby realize the OFDM reception apparatus 200 capable of further improving the error rate characteristic of decoded data in addition to the effect of Embodiment 1.

Embodiment 3

Figure 10:
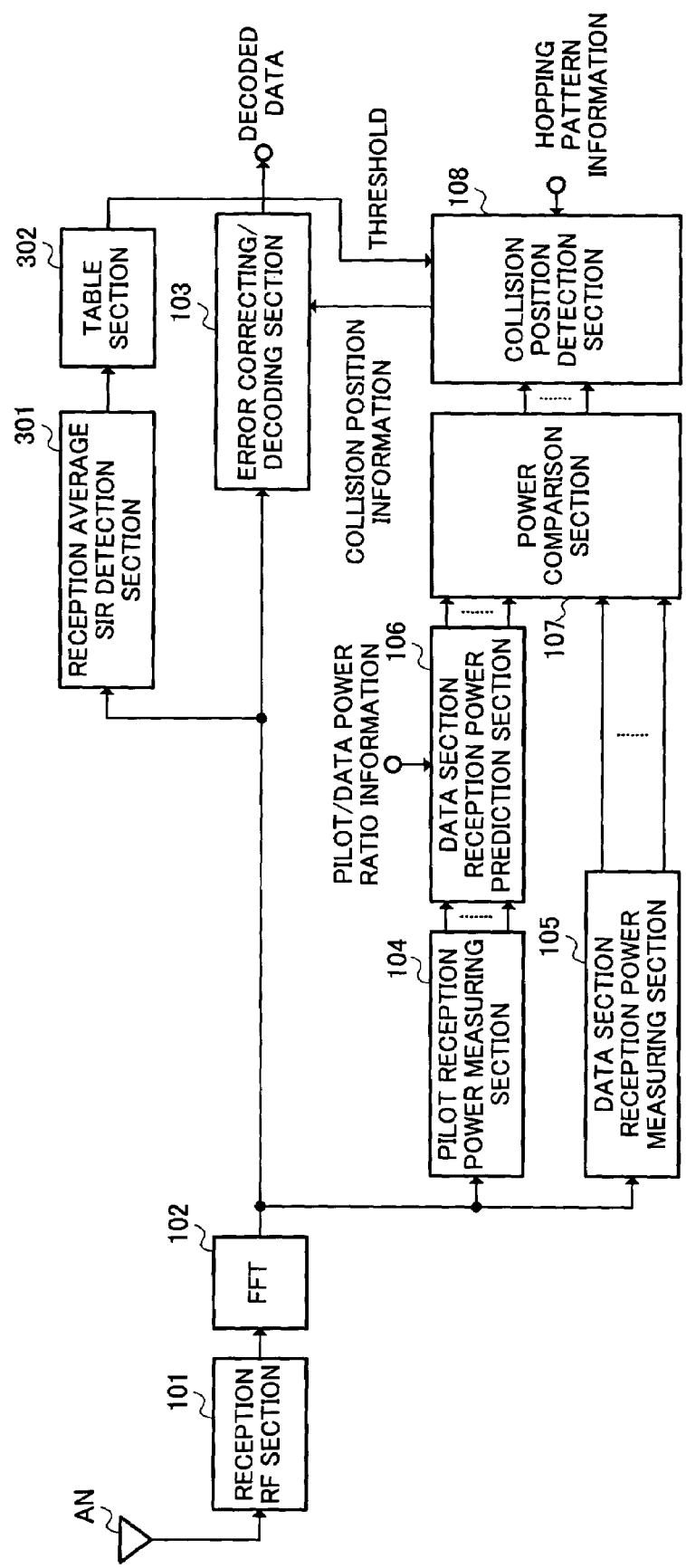
FIG. 10 is a block diagram showing the configuration of an OFDM reception apparatus according to Embodiment 3 of the present invention.

FIG. 10 in which components corresponding to those in FIG. 4 are assigned the same reference numerals shows the configuration of an OFDM reception apparatus according to Embodiment 3. The OFDM reception apparatus 300 has the same configuration as the OFDM reception apparatus 100 of Embodiment 1 except that it includes a reception average SIR detection section 301 that detects an average SIR (Signal to Interference Ratio) of an OFDM signal received as a reception quality detection section and a table section 302 that stores data of thresholds associated with reception quality and outputs the threshold data corresponding to the detected reception quality to a collision position detection section 108.

The reception average SIR detection section 301 detects an SIR based on a pilot symbol and calculates an average value of the SIR for, for example, a 1-slot period to detect reception quality of a received OFDM signal. The detected reception quality is sent to the table section 302.

Figure 11:
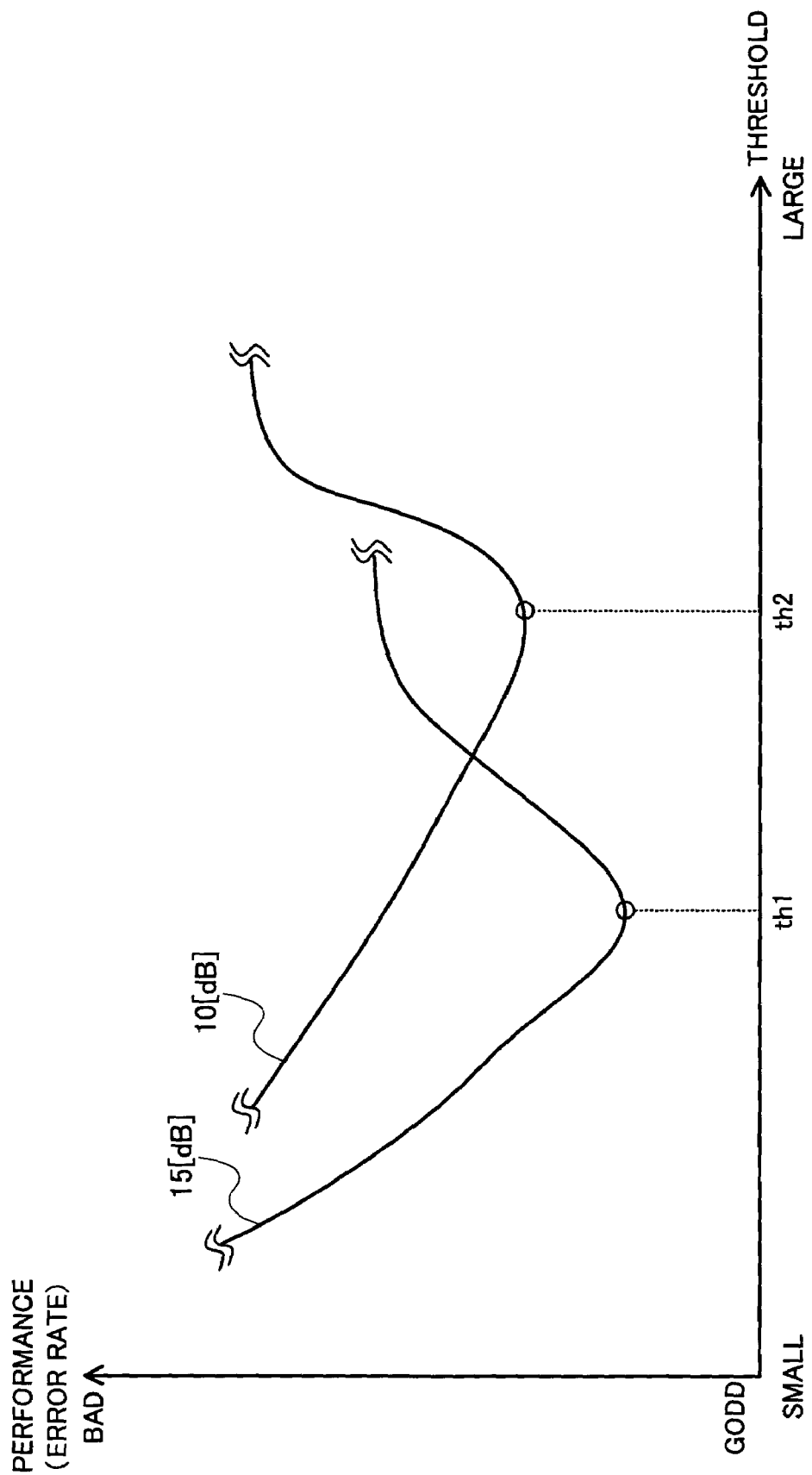
FIG. 11 illustrates a characteristic curve diagram showing a relationship between a threshold and error rate for each SIR.

As shown in, for example, FIG. 11, the table section 302 stores optimal threshold data th1, th2 for the SIR for each predetermined SIR (FIG. 11 shows only SIRs of 15 [dB] and 10 [dB] for simplicity of explanation). The table section 302 sends the optimal threshold th1, th2 for the SIR closest to the SIR output from the reception average SIR detection section 301 to the collision position detection section 108.

In a simple explanation of FIG. 11, when the SIR is better (15 [dB] in the figure), the variation in the received signal due to interference must be smaller. In this case, the optimal threshold th1 has a relatively small value. On the contrary, when the SIR is bad (10 [dB] in the figure), the variation in the received signal due to interference increases. In this case, the optimal threshold th2 has a relatively large value.

Noting that the optimal threshold used in the collision position detection section 108 varies depending on the reception quality, this embodiment provides the table section 302 storing optimal thresholds according to the reception quality.

Here, as is also evident from FIG. 11, when the threshold is decreased from the optimal threshold th1, th2, the number of data symbols detected to be involved in a collision increases and when the threshold is increased from the optimal threshold th1, th2, the number of data symbols detected to be involved in a collision decreases and in both cases, the error rate characteristic deteriorates. In this regard, the case where the threshold is set to infinity corresponds to conventional general processing when no consideration is given to a collision.

Thus, in addition to the configuration of Embodiment 1, this embodiment is provided with the reception average SIR detection section 301 that detects reception quality and the table section 302 storing optimal thresholds according to the reception quality so that the collision position detection section 108 uses an optimal threshold output from the table section 302 according to the reception quality, and can thereby realize the OFDM reception apparatus 300 capable of further improving the error rate characteristic of decoded data in addition to the effect of Embodiment 1.

Embodiment 4

Figure 12:
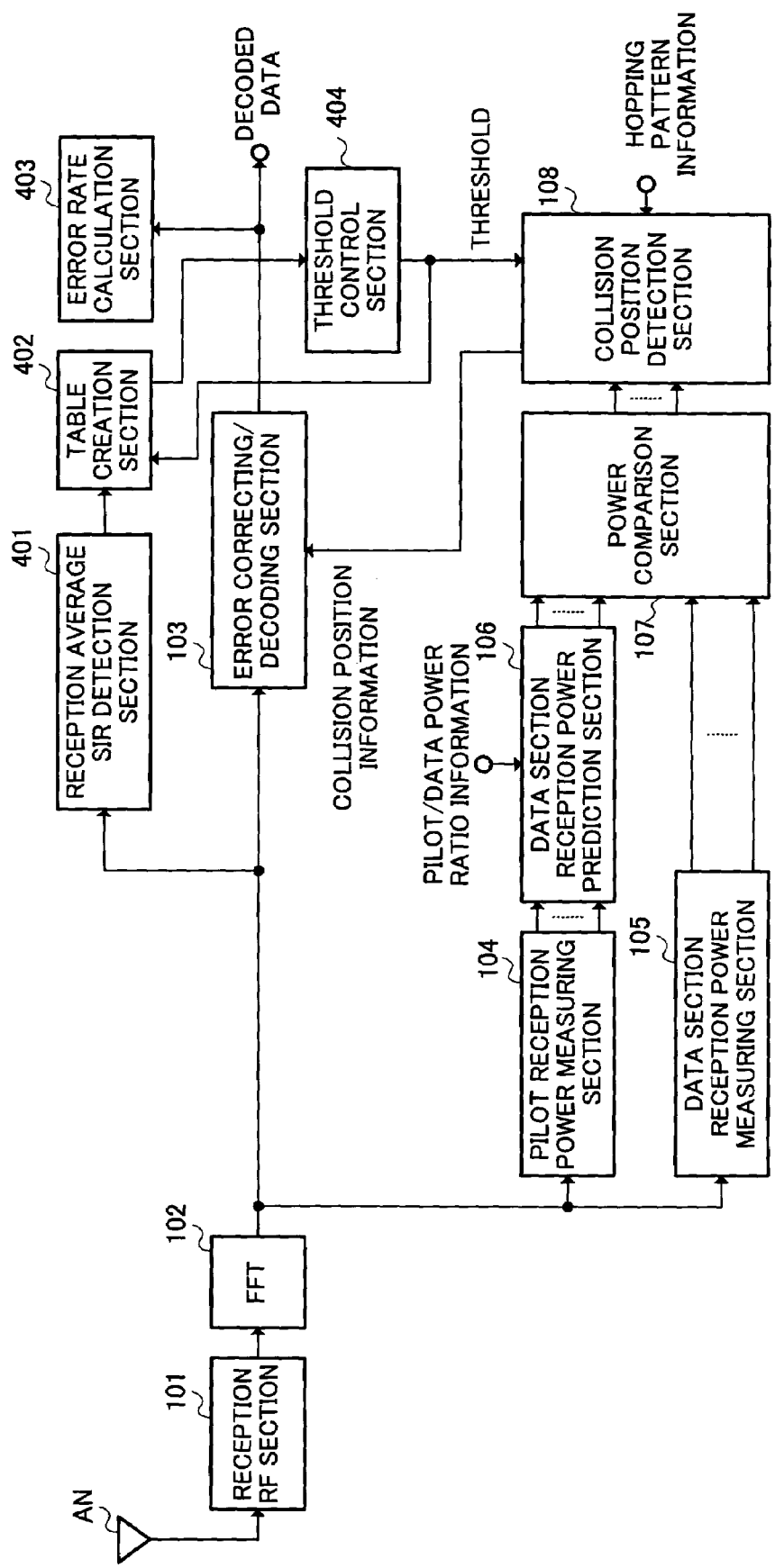
FIG. 12 is a block diagram showing the configuration of an OFDM reception apparatus according to Embodiment 4.

FIG. 12 in which components corresponding to those in FIG. 4 are assigned the same reference numerals shows the configuration of an OFDM reception apparatus according to Embodiment 4. The OFDM reception apparatus 400 has the same configuration as the OFDM reception apparatus 100 of Embodiment 1 except that it includes a reception average SIR detection section 401 that detects an average SIR (Signal to Interference Ratio) of a received OFDM signal as a reception quality detection section, a table creation section 402, an error rate calculation section 403 and a threshold control section 404.

The reception average SIR detection section 401 detects an SIR based on a pilot symbol, calculates an average of the SIR for, for example, a 1-slot period and thereby detects reception quality of the received OFDM signal. The detected reception quality is sent to the table creation section 402.

The table creation section 402 creates a lookup table showing a relationship between a threshold input from the threshold control section 404 and an error rate calculated by the error rate calculation section 403 for each reception quality (average SIR in this embodiment) Furthermore, the table creation section 402 supplies data corresponding to the SIR detected by the reception average SIR detection section 401 out of the data in the created lookup table to the threshold control section 404.

The threshold control section 404 looks up reference data input from the table creation section 402, finds an optimal threshold and sends it to a collision position detection section 108. More specifically, the table creation section 402 collects data showing a characteristic curve for each reception quality shown in FIG. 11 and the threshold control section 404 receives data corresponding to the reception quality, finds optimal thresholds th1, th2 and sends them to the collision position detection section 108.

That is, what is different from Embodiment 3 is that Embodiment 3 stores an optimal threshold for each reception quality in the table section 302 beforehand, whereas in this embodiment the table creation section 402 updates data one by one and creates the characteristic curve as shown in FIG. 11. This makes it possible to set more appropriate optimal thresholds from the relationship between the actual threshold and error rate and further improve the error rate characteristic.

Thus, in addition to the configuration of Embodiment 1, this embodiment provides the reception average SIR detection section 401 that detects reception quality, the threshold control section 404, the error rate calculation section 403 and the table creation section 402 that creates a lookup table showing the relationship between the threshold and the error rate when the threshold controlled by the threshold control section 404 is used for each reception quality, and looks up the lookup table updated at any time through the threshold control section 404 and sets an optimal threshold at the collision position detection section 108, and can thereby realize an OFDM reception apparatus capable of further improving the error rate characteristic compared to Embodiment 3.

Foregoing Embodiments 3, 4 have described the case where an average SIR is detected as reception quality, but it is also possible to detect, for example, CIR (Carrier to Interference Ratio), etc., and the reception quality to be detected is not limited to SIR. Furthermore, the table section 302 of Embodiment 3 stores optimal thresholds corresponding to SIRs, but the present invention is not limited to this and the point is to store an optimal threshold corresponding to reception quality. Likewise, the table creation section 402 of Embodiment 4 has described the case where a table which associates a threshold with an error rate for each predetermined SIR is created, but SIR is not the only factor and the point is to create a table which associates a threshold with an error rate for each reception quality.

The present invention is not limited to the above described embodiments but can be implemented modified in various ways.

An aspect of the OFDM signal collision position detection apparatus of the present invention is an OFDM signal collision position detection apparatus that detects collision positions of OFDM signals transmitted from a plurality of cells, comprising a known signal measuring section that measures reception power of a known signal, a data signal measuring section that measures reception power of a data signal, a data signal prediction section that predicts reception power of the data signal based on the measured reception power of the known signal, a power comparison section that compares the reception power of the data signal predicted by the data signal prediction section with the reception power of the data signal measured by the data signal measuring section for each subcarrier and a collision position detection section that detects positions of data symbols colliding with each other between a plurality of cells by detecting positions where there is a large variation of the measured reception power of the data signal with respect to the predicted reception power of the data signal based on the comparison result.

According to this configuration, the known signal measuring section measures reception power of a known signal not affected by interference caused by a collision between a plurality of cells based on the known signal arranged so as to prevent any collision between the plurality of cells, while the data signal prediction section predicts reception power of a data signal when no collision occurs based on the reception power of this known signal. The power comparison section compares the actual reception power of the data signal with the reception power of the data signal when no collision occurs for each subcarrier and the collision position detection section detects the position of a data symbol having a large variation (difference) as the collision position. As a result, it is possible to accurately detect positions of data symbols colliding with each other between a plurality of cells, that is, subcarriers and time point.

In another aspect of the OFDM signal collision position detection apparatus of the present invention, the collision position detection section detects a collision when measured reception power of a data signal is greater than a first threshold in a positive direction with respect to predicted reception power of the data signal or smaller than a second threshold in a negative direction.

According to this configuration, when the phases of data symbols involved in a collision are similar, the collision is detected based on a first threshold and when the phases of data symbols involved in the collision are not similar, the collision is detected based on a second threshold, and therefore it is possible to detect any collision between data symbols without exception irrespective of the phases of data symbols involved in the collision.

A further aspect of the OFDM reception apparatus of the present invention is an OFDM reception apparatus that receives and demodulates an OFDM signal, comprising a known signal measuring section that measures reception power of a known signal, a data signal measuring section that measures reception power of a data signal, a data signal prediction section that predicts reception power of the data signal based on the measured reception power of the known signal, a power comparison section that compares the reception power of the data signal predicted by the data signal prediction section with the reception power of the data signal measured by the data signal measuring section for each subcarrier, a collision position detection section that detects positions of data symbols colliding with each other between a plurality of cells by detecting positions where there is a large variation of the measured reception power of the data signal with respect to the predicted reception power of the data signal based on the comparison result and an error correcting decoding section that applies error correcting decoding processing to the received OFDM signal by reducing likelihood of data symbols at positions at which the collision position detection section has detected the collision.

According to this configuration, the known signal measuring section, data signal measuring section, data signal prediction section, power comparison section and collision position detection section accurately detect positions of data symbols (subcarriers, time point) involved in the collision between a plurality of cells. Furthermore, the error correcting decoding section carries out error correcting processing by reducing likelihood of data symbols detected to be involved in the collision, and can thereby remove impulse-like noise due to the collision of data symbols from the error correcting processing and improve the error rate characteristic of decoded data.

In a still further aspect of the OFDM reception apparatus of the present invention, the collision position detection section uses a threshold for detecting a position where the above described variation is large and further comprises, in addition to the above described configuration, an error rate calculation section that calculates an error rate of decoded data obtained by the error correcting decoding section and a threshold control section that changes a threshold at the collision position detection section according to the error rate calculation result.

According to this configuration, the number of data symbols which are regarded as being involved in the collision increases when the threshold control section decreases the threshold, whereas the number of data symbols which are regarded as being involved in the collision decreases when the threshold control section increases the threshold. This number of data symbols regarded as being involved in the collision has a great effect on the error rate. In consideration of this, the threshold control section adaptively changes the threshold according to the error rate calculation result, and can thereby detect data symbols involved in the collision using an optimal threshold with which an optimal error rate characteristic is obtained.

In a still further aspect of the OFDM reception apparatus of the present invention, the collision position detection section uses a threshold in detecting positions where the above described variation is large and further comprises, in addition to the above described configuration, a reception quality detection section that detects reception quality of the received OFDM signal and a table that stores data of thresholds associated with the reception quality and outputs threshold data corresponding to the detected reception quality to the collision position detection section.

According to this configuration, an optimal threshold corresponding to reception quality is supplied to the collision position detection section from the table section, and therefore the collision position detection section can detect the collision position more accurately and thereby further improve the error rate characteristic as a result.

In a still further aspect of the OFDM reception apparatus of the present invention, the collision position detection section uses a threshold in detecting positions where the above described variation is large and further comprises, in addition to the above described configuration, an error rate calculation section that calculates an error rate of decoded data obtained from the error correcting decoding section, a reception quality detection section that detects reception quality of the received OFDM signal, a threshold control section that controls a threshold in the collision position detection section, a table creation section that creates a lookup table showing a relationship between a threshold and an error rate when the threshold controlled by the threshold control section is used for each reception quality, wherein the threshold control section sets an optimal threshold in the collision position detection section with reference to the lookup table.

According to this configuration, the table creation section updates and creates a lookup table indicating the relationship between a threshold and an error rate when the threshold is used at any time for each reception quality and the threshold control section sets an optimal threshold in the collision position detection section with reference to the lookup table updated at any time, and therefore a more accurate optimal threshold is set as the threshold used by the collision position detection section. As a result, the error rate characteristic is further improved.

As described above, by comparing reception power of a data signal predicted from reception power of a known signal with the actual reception power of the data signal for each subcarrier and every burst period and regarding, when the reception power of the data signal is changed from the reception power predicted from reception power of a pilot signal, the data signal as being involved in a collision between a plurality of cells, the present invention can realize a collision position detection apparatus capable of accurately detecting positions of data signals colliding with each other between a plurality of cells.

Furthermore, data symbols detected by the collision position detection apparatus are notified to the error correcting decoding section and the error correcting decoding section carries out error correcting decoding processing by reducing likelihood of data symbols at positions where the collision position detection section has detected the collision, and therefore it is possible to realize an OFDM reception apparatus capable of improving the error rate characteristic of decoded data.

This application is based on the Japanese Patent Application No. 2003-23747 filed on Jan. 31, 2003, entire content of which is expressly incorporated by reference herein.

INDUSTRIAL APPLICABILITY

The present invention is suitable for use in, for example, a mobile communication terminal.

[FIG. 1]
CELL A
CELL B

[FIG. 2]
FREQUENCY
CELL A
CELL B
TIME
COLLISION OF HOPPING PATTERNS

[FIG. 3]
QUALITY
QUALITY DETERIORATION DUE TO COLLISION
SYMBOL

[FIG. 4]
100 OFDM RECEPTION APPARATUS
101 RECEPTION RF SECTION
104 PILOT RECEPTION POWER MEASURING SECTION
105 DATA SECTION RECEPTION POWER MEASURING SECTION
PILOT/DATA POWER RATIO INFORMATION
106 DATA SECTION RECEPTION POWER PREDICTION SECTION
107 POWER COMPARISON SECTION
COLLISION POSITION INFORMATION
103 ERROR CORRECTING/DECODING SECTION
108 COLLISION POSITION DETECTION SECTION
DECODED DATA
HOPPING PATTERN INFORMATION

[FIG. 5]
POWER
POWER INCREASE DUE TO COLLISION
SYMBOL

[FIG. 6]
POWER
SYMBOL
POWER DECREASE DUE TO COLLISION

[FIG. 7]
OTHER CELL SIGNAL
OWN CELL SIGNAL
RECEIVED SIGNAL
ACTUAL RECEPTION POWER
RECEPTION POWER PREDICTED FROM PILOT

[FIG. 8]
OWN CELL SIGNAL
OTHER CELL SIGNAL
RECEIVED SIGNAL
ACTUAL RECEPTION POWER
RECEPTION POWER PREDICTED FROM PILOT

[FIG. 9]
200 OFDM RECEPTION APPARATUS
101 RECEPTION RF SECTION
104 PILOT RECEPTION POWER MEASURING SECTION
105 DATA SECTION RECEPTION POWER MEASURING SECTION
PILOT/DATA POWER RATIO INFORMATION
106 DATA SECTION RECEPTION POWER PREDICTION SECTION
103 ERROR CORRECTING/DECODING SECTION
COLLISION POSITION INFORMATION
107 POWER COMPARISON SECTION
201 ERROR RATE CALCULATION SECTION
202 THRESHOLD CONTROL SECTION
THRESHOLD
108 COLLISION POSITION DETECTION SECTION
DECODED DATA
HOPPING PATTERN INFORMATION

[FIG. 10]
300 OFDM RECEPTION APPARATUS
101 RECEPTION RF SECTION
104 PILOT RECEPTION POWER MEASURING SECTION
105 DATA SECTION RECEPTION POWER MEASURING SECTION
PILOT/DATA POWER RATIO INFORMATION
106 DATA SECTION RECEPTION POWER PREDICTION SECTION
301 RECEPTION AVERAGE SIR DETECTION SECTION
107 POWER COMPARISON SECTION
302 TABLE SECTION
103 ERROR CORRECTING/DECODING SECTION
COLLISION POSITION INFORMATION
THRESHOLD
108 COLLISION POSITION DETECTION SECTION
DECODED DATA
HOPPING PATTERN INFORMATION

[FIG. 11]
PERFORMANCE (ERROR RATE)
BAD
GOOD
SMALL
LARGE
THRESHOLD

[FIG. 12]
400 OFDM RECEPTION APPARATUS
101 RECEPTION RF SECTION
104 PILOT RECEPTION POWER MEASURING SECTION
105 DATA SECTION RECEPTION POWER MEASURING SECTION
401 RECEPTION AVERAGE SIR DETECTION SECTION
PILOT/DATA POWER RATIO INFORMATION
106 DATA SECTION RECEPTION POWER PREDICTION SECTION
402 TABLE CREATION SECTION
103 ERROR CORRECTING/DECODING SECTION
COLLISION POSITION INFORMATION
107 POWER COMPARISON SECTION
403 ERROR RATE CALCULATION SECTION
404 THRESHOLD CONTROL SECTION
THRESHOLD
108 COLLISION POSITION DETECTION SECTION
DECODED DATA
HOPPING PATTERN INFORMATION

What is claimed is:

1. An OFDM signal collision position detection apparatus that detects collision positions of OFDM signals transmitted from a plurality of cells, comprising:

a known signal measuring section that measures reception power of a known signal;

a data signal measuring section that measures reception power of a data signal;

a data signal prediction section that predicts reception power of the data signal based on the measured reception power of the known signal;

a power comparison section that compares the reception power of the data signal predicted by said data signal prediction section with the reception power of the data signal measured by said data signal measuring section for each subcarrier; and a collision position detection section that detects positions of data symbols colliding with each other between a plurality of cells by detecting positions where there is a large variation of said measured reception power of the data signal with respect to said predicted reception power of the data signal based on the comparison result obtained by said power comparison section, wherein:

said collision position detection section detects a collision when said measured reception power of the data signal is greater than a first threshold in a positive direction with respect to said predicted reception power of the data signal or smaller than a second threshold in a negative direction.

2. An OFDM reception apparatus that receives and demodulates an OFDM signal, comprising:

a known signal measuring section that measures reception power of a known signal;

a data signal measuring section that measures reception power of a data signal, a data signal prediction section that predicts reception power of the data signal based on the measured reception power of the known signal;

a power comparison section that compares the reception power of the data signal predicted by said data signal prediction section with the reception power of the data signal measured by said data signal measuring section for each subcarrier;

a collision position detection section that detects positions of data symbols colliding with each other between a plurality of cells by detecting positions where there is a large variation of said measured reception power of the data signal with respect to said predicted reception power of the data signal based on the comparison result obtained by said power comparison section;

an error correcting decoding section that applies error correcting decoding processing to the received OFDM signal by reducing likelihood of data symbols at positions at which said collision position detection section has detected the collision;

an error rate calculation section that calculates an error rate of decoded data obtained by said error correcting decoding section; and a threshold control section that changes a threshold at said collision position detection section according to the error rate calculation result, wherein:

said collision position detection section uses said threshold for detecting a position where said variation is large.

3. The OFDM reception apparatus according to claim 2, further comprising:

a reception quality detection section that detects reception quality of the received OFDM signal; and a table that stores data of thresholds associated with the reception quality and outputs said threshold data corresponding to said detected reception quality to said collision position detection section.

4. The OFDM reception apparatus according to claim 2, further comprising:

a reception quality detection section that detects reception quality of the received OFDM signal; and a table creation section that creates a lookup table showing a relationship between said threshold and an error rate when the threshold controlled by said threshold control section is used for each reception quality, wherein said threshold control section sets an optimal threshold in said collision position detection section with reference to said lookup table.

5. An OFDM signal collision position detection method that detects collision positions of OFDM signals transmitted from a plurality of cells, the method comprising:

a step of measuring, by a signal power measurer, reception power of a known signal;

a step of measuring reception power of a data signal;

a step of predicting reception power of the data signal based on the measured reception power of the known signal;

a step of comparing the predicted reception power of the data signal with the measured reception power of the data signal for each subcarrier; and a step of detecting positions of data symbols colliding with each other between a plurality of cells by detecting positions where there is a large variation of the measured reception power of the data signal with respect to the predicted reception power of the data signal based on the comparison result, wherein detecting a collision when the measured reception power of the data signal is greater than a first threshold in a positive direction with respect to the predicted reception power of the data signal or smaller than a second threshold in a negative direction.

6. An OFDM reception method, comprising:

a step of measuring, by a signal power measurer, reception power of a known signal;

a step of measuring reception power of a data signal;

a step of predicting reception power of the data signal based on the measured reception power of the known signal;

a step of comparing the predicted reception power of the data signal with the measured reception power of the data signal for each subcarrier;

a step of detecting positions of data symbols colliding with each other between a plurality of cells by detecting positions where there is a large variation of the measured reception power of the data signal with respect to the predicted reception power of the data signal based on the comparison result, by using a threshold for detecting a position where the variation is large;

a step of applying error correcting decoding processing by reducing likelihood of data symbols at positions where the collision is detected;

a step of calculating an error rate of the decoded data; and a step of changing the threshold according to the error rate calculation result.

* * * * *

UNITED STATES PATENT AND TRADEMARK OFFICE
CERTIFICATE OF CORRECTION

PATENT NO. : 7,626,919 B2
APPLICATION NO. : 10/542772
DATED : December 1, 2009
INVENTOR(S) : Kenichi Miyoshi et al.

It is certified that error appears in the above-identified patent and that said Letters Patent is hereby corrected as shown below:

In the Letters Patent issued on December 1, 2009, Item (54), title of the patent, reads:

"OFDM SIGNAL COLLISION POSITION DETECTION APPARATUS AND OFDM RECEPTION DEVICE"

and should read:

"OFDM SIGNAL COLLISION POSITION DETECTION APPARATUS AND OFDM RECEPTION APPARATUS"

In the Letters Patent issued on December 1, 2009, Claim 2, column 13, line 31, reads:

"power of data signal,"

and should read:

"power of data signal;"

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,626,919 B2 | Page 1 of 1 |
| APPLICATION NO. | : 10/542772 | |
| DATED | : December 1, 2009 | |
| INVENTOR(S) | : Kenichi Miyoshi et al. | |

It is certified that error appears in the above-identified patent and that said Letters Patent is hereby corrected as shown below:

In the Letters Patent issued on December 1, 2009, Title Page, Item (54), and at Column 1, lines 1-3, title of the patent, reads:

"OFDM SIGNAL COLLISION POSITION DETECTION APPARATUS AND OFDM RECEPTION DEVICE"

and should read:

"OFDM SIGNAL COLLISION POSITION DETECTION APPARATUS AND OFDM RECEPTION APPARATUS"

In the Letters Patent issued on December 1, 2009, Claim 2, column 13, line 31, reads:

"power of data signal,"

and should read:

"power of data signal;"

This certificate supersedes the Certificate of Correction issued June 15, 2010.

Signed and Sealed this

Twentieth Day of July, 2010

David J. Kappos
*Director of the United States Patent and Trademark Office*